US007752347B2

(12) United States Patent
Takei

(10) Patent No.: US 7,752,347 B2
(45) Date of Patent: Jul. 6, 2010

(54) COMPUTER READABLE MEDIUM RECORDING AN INFORMATION PROVIDING PROGRAM, INFORMATION PROVIDING DEVICE, AND METHOD FOR PROVIDING INFORMATION

(75) Inventor: Noriyuki Takei, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 195 days.

(21) Appl. No.: 12/048,073

(22) Filed: Mar. 13, 2008

(65) Prior Publication Data

US 2008/0235408 A1    Sep. 25, 2008

(30) Foreign Application Priority Data

Mar. 23, 2007   (JP)   ............................. 2007-077025
Mar. 28, 2007   (JP)   ............................. 2007-084517
Jan. 15, 2008   (JP)   ............................. 2008-005546

(51) Int. Cl.
   *G06F 3/00*  (2006.01)
(52) U.S. Cl. ....................................................... 710/15
(58) Field of Classification Search ....................... None
   See application file for complete search history.

(56) References Cited

U.S. PATENT DOCUMENTS 7,255,501 B2 *   8/2007  Arai ............................. 400/74
2006/0015285 A1 *  1/2006  Fuller et al. .................. 702/127

2007/0139686 A1 *   6/2007  Nishimi ...................... 358/1.15

FOREIGN PATENT DOCUMENTS

| JP | 06-004234 | 1/1994 |
| JP | 09-026867 | 1/1997 |
| JP | 2000132291 A | 5/2000 |
| JP | 2001321586 A | 11/2001 |
| JP | 2002229755 A | 8/2002 |
| JP | 2003242056 A | 8/2003 |
| JP | 2004-021400 | 1/2004 |
| JP | 2005260494 A | 9/2005 |
| JP | 2006088381 A | 4/2006 |
| JP | 2006243952 A | 9/2006 |

* cited by examiner

*Primary Examiner*—Eron J Sorrell
(74) *Attorney, Agent, or Firm*—Hogan Lovells US LLP

(57) ABSTRACT

The present invention provides a computer readable medium recording a program for providing information relating to an optional device installable on an apparatus such as a printer, the program being an information providing program for providing information, to a user in an easily understandable form, related to an installable optional device that is presently uninstalled. In the information providing program for causing an information providing device to execute a processing of providing information relating to an optional device installable on a target apparatus, the information providing device is caused to execute: acquiring information relating to the installation status of the optional device on the target apparatus and determining an uninstalled optional device, which is an installable optional device that has not been installed; and displaying an image representing the determined uninstalled optional device to a user.

10 Claims, 6 Drawing Sheets

FIG.4

| OPTIONAL DEVICE | INSTALLED/UNINSTALLED |
|---|---|
| MEMORY 192 MB | YES |
| MEMORY 256 MB | NO |
| ⋮ | ⋮ |
| PAPER CASSETTE 2 | YES |
| PAPER CASSETTE 3 | NO |
| TWO-STAGE PAPER CASSETTE | NO |
| ⋮ | ⋮ |
| HDD UNIT | NO |
| ⋮ | ⋮ |

COMPUTER READABLE MEDIUM RECORDING AN INFORMATION PROVIDING PROGRAM, INFORMATION PROVIDING DEVICE, AND METHOD FOR PROVIDING INFORMATION

CROSS-REFERENCE TO RELATED APPLICATIONS

This application is based upon and claims the benefit of priority from the prior Japanese Patent Application No. 2007-77025, filed on Mar. 23, 2007, the prior Japanese Patent Application No. 2007-84517, filed on Mar. 28, 2007, and the prior Japanese Patent Application No. 2008-5546, filed on Jan. 15, 2008 the entire contents of which are incorporated herein by reference.

BACKGROUND OF THE INVENTION

1. Field of the Invention

The present invention relates to a computer readable medium recording a program or the like for providing information relating to an optional device installable on an apparatus such as a printer, and more particularly to a computer readable medium recording an information providing program or the like that can provide information, to a user in an easily understandable form, relating to an installable optional device that is presently uninstalled.

2. Description of the Related Art

Typically optional devices that can be optionally installed are prepared for apparatuses such as printers and copiers. For example, in the case of a printer, a plurality of memory units of different capacity, HDD units, a plurality of paper feeders for expansion, and duplex printing mechanisms are prepared as optional devices.

For example, in the case of a printer, information as to whether these optional devices have been installed on the apparatus is provided by a printer driver provided in the host device. More specifically, when bidirectional communication is possible between the host device and printer, the printer driver acquires information on the installed optional devices from the printer and displays the names of the installed optional devices in the list format. Furthermore, when the bidirectional communication is impossible, the installation status of the optional devices is inputted by the user into the host device and set to the printer driver, and this set information is similarly displayed in the list format. Such information is displayed on an optional settings window for performing settings and display with respect to detailed items, rather than on the basic settings window for performing setting and display with respect to basic items, from among the user interface windows prepared to perform the setting of various conditions relating to printing in the printer.

Such provision of information relating to the optional devices is described, for example, in Japanese Patents Nos. 3017605 and 3740216 and Japanese Patent Laid-open No. 2004-21400. Japanese Patent No. 3017605 discloses a configuration in which the installation status of an optional device is indicated by an external appearance image, Japanese Patent No. 3740216 discloses a feature of changing the displayed contents according to the installation status of an optional device, and Japanese Patent Laid-open No. 2004-21400 discloses a feature of automatically acquiring configuration information for the printer.

However, with the above-described conventional methods for providing information relating to an optional device, the attention is focused on the presently installed optional device, and the information relating to an installable optional device that has not been installed is not provided to the user in an easily understandable form.

Such lack of easily understandable information that relates to the uninstalled optional device is inconvenient when the user tries to find a way of using the optional device effectively and conveniently in an apparatus such as a printer, is hardly useful as an incentive for purchasing new optional devices, and causes the suppliers of apparatuses such as a printers to miss a chance of selling the optional device.

SUMMARY OF THE INVENTION

Accordingly, it is an aspect of the present invention to provide a computer readable medium recording an information providing program or the like that provides an information relating to an optional device installable on an apparatus such as a printer, this program being capable of providing information relating to an installable optional device that is presently uninstalled to a user in an easily understandable form.

In order to attain the above-described aspect, one gist of the present invention resides in a computer readable medium recording an information providing program for causing an information providing device to execute a processing of providing information relating to an optional device installable on an target apparatus, the program causing the information providing device to execute: acquiring information relating to the installation status of the optional device on the target apparatus and determining an uninstalled optional device, which is an installable optional device that has not been installed; and displaying an image representing the determined uninstalled optional device to a user.

In a preferred mode of the above-described invention, the image representing the optional device that has been installed on the target apparatus is displayed to the user so that the installed optional device can be distinguished from the uninstalled optional device.

In another preferred mode of the above-described invention, the image representing the uninstalled optional device is displayed as an icon that is gray-out displayed.

In yet another preferred mode of the above-described invention, an external appearance image of the target apparatus including the optional device that has been installed on the target apparatus is also displayed to the user, and the display of the image is performed with respect to the optional device that is not displayed in the external appearance image and the optional device that is difficult to be recognized in the external appearance image.

In yet another preferred mode of the above-described invention, the external appearance image of the target apparatus including the optional device that has been installed on the target apparatus is also displayed to the user.

In yet another preferred mode of the above-described invention, the image representing the uninstalled optional device is displayed close to the external appearance image of the target apparatus.

In yet another preferred mode of the above-described invention, data on the image representing the uninstalled optional device are stored in the information providing device for all the installable optional devices of the target apparatus.

In yet another preferred mode of the above-described invention, an interface window which has a basic settings window and a detail settings window, and which serves for the user to perform a setting operation for the target apparatus is provided by the information providing device, and the display of the image representing the uninstalled optional device is performed on the basic settings window.

In yet another preferred mode of the above-described invention, the target apparatus is a printer, and the information providing device is a host device of the printer or the printer.

In order to attain the above-described aspect, another gist of the present invention resides in an information providing device that provides information relating to an optional device installable on a target apparatus, the information providing device having an information acquisition unit which acquires information relating to the installation status of the optional device on the target apparatus and determines an uninstalled optional device, which is an installable optional device that has not been installed, and an information display unit which displays an image representing the determined uninstalled optional device to a user.

In order to attain the above-described aspect, yet another gist of the present invention resides in a method for providing information in an information providing device that provides information relating to an optional device installable on a target apparatus, the method having a step in which the information providing device acquires information relating to the installation status of the optional device on the target apparatus and determines an uninstalled optional device, which is an installable optional device that has not been installed, and a step in which the information providing device displays an image representing the determined uninstalled optional device to a user.

Other objects and features of the present invention will become obvious from the embodiments of the invention described hereinbelow.

BRIEF DESCRIPTION OF THE DRAWINGS

FIG. 4 illustrates an example of optional information that will be stored;

DESCRIPTION OF THE PREFERRED EMBODIMENTS

Figure 1:
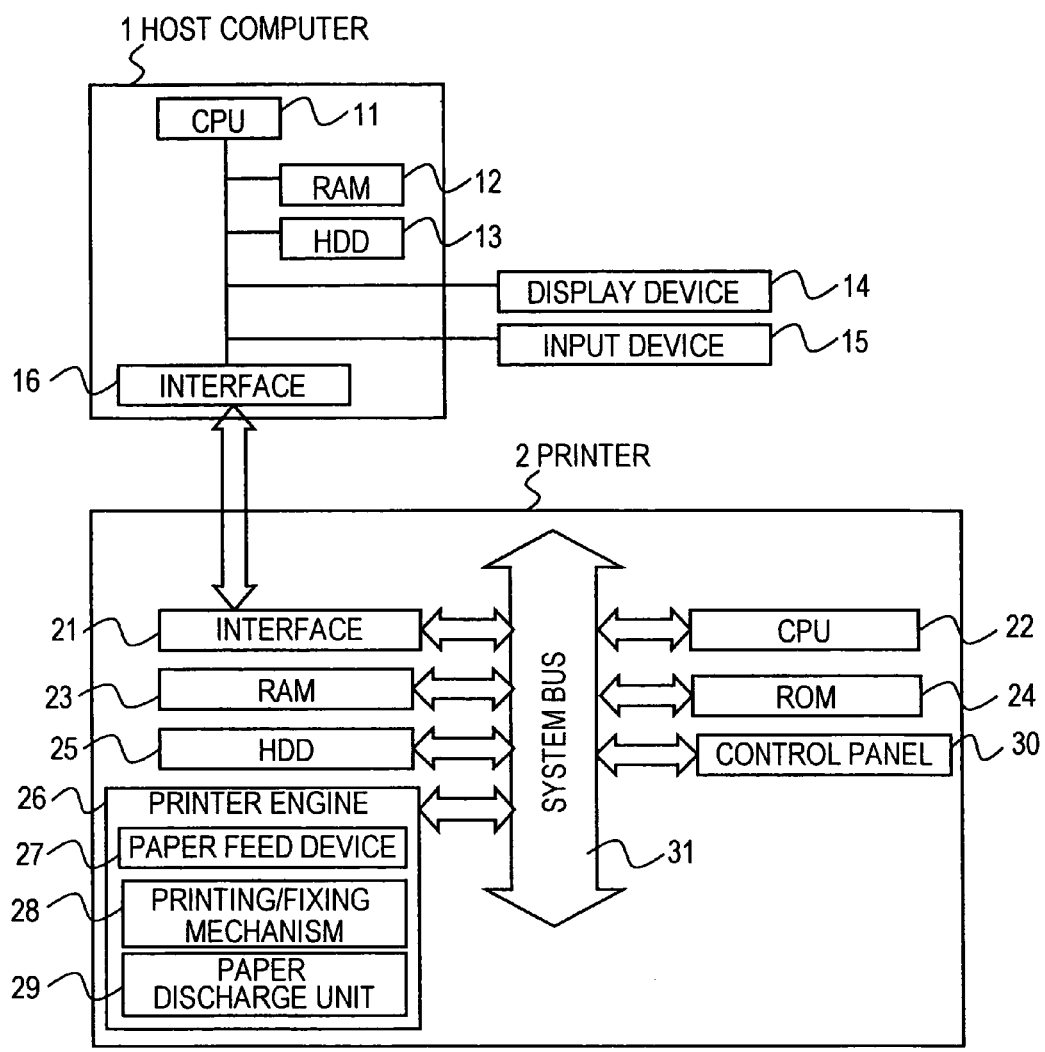
FIG. 1 is a hardware configuration diagram of an embodiment of the information providing device employing the present invention.

Embodiments of the present invention will be descried below with reference to the appended drawings. However, the technical scope of the present invention is not limited to the embodiments. In the figures, identical or similar components are assigned with identical reference numerals or reference symbols.

FIG. 1 is a hardware structural diagram relating to an embodiment of an information providing device employing the present invention. A host computer 1 shown in FIG. 1 is an information providing device employing the present invention, and provides information relating to an uninstalled optional device to a user in the form that is easy to understand, by displaying of a driver for a printer 2 connected to the device an image of the uninstalled optional device that can be installed on the printer 2 in a basic settings window for printing settings.

In the present embodiment, an apparatus for installing the optional device is the printer 2 shown in FIG. 1, and the information relating to the optional device is provided to the user on the host computer 1 for the printer 2.

The host computer 1 can have a typical personal computer configuration, and as shown in FIG. 1, hardware therefor includes a CPU 11, an RAM 12, an HDD 13, an interface 16 for external devices, a display device 14 as a monitor, and an input device 15 such as a keyboard or mouse.

Further, the printer 2 is, for example, a laser printer, and hardware therefor includes an interface 21 for the host computer 1, a CPU 22, an RAM 23, an ROM 24, an HDD 25, a printer engine 26, a control panel 30, and a system bus 31, as shown in FIG. 1. The printer engine 26 is a unit for executing printing on a printing medium and includes a paper feed device 27 such as a paper cassette for feeding the printing medium, a printing/fixing mechanism 28 serving to execute the printing, and a paper discharge unit 29 for discharging the printing medium after printing.

Further, as described hereinabove, several optional devices can be installed on the printer 2. Thus, in addition to the devices provided by default for the memory such as RAM 23, HDD 25, paper feed device 27, and paper discharge unit 29 and the like, various optional devices such as an expansion memory, an HDD, a paper feed device, and a paper discharge units are prepared to improve functionality. A duplex printing mechanism is another example of optional device.

Figure 2:
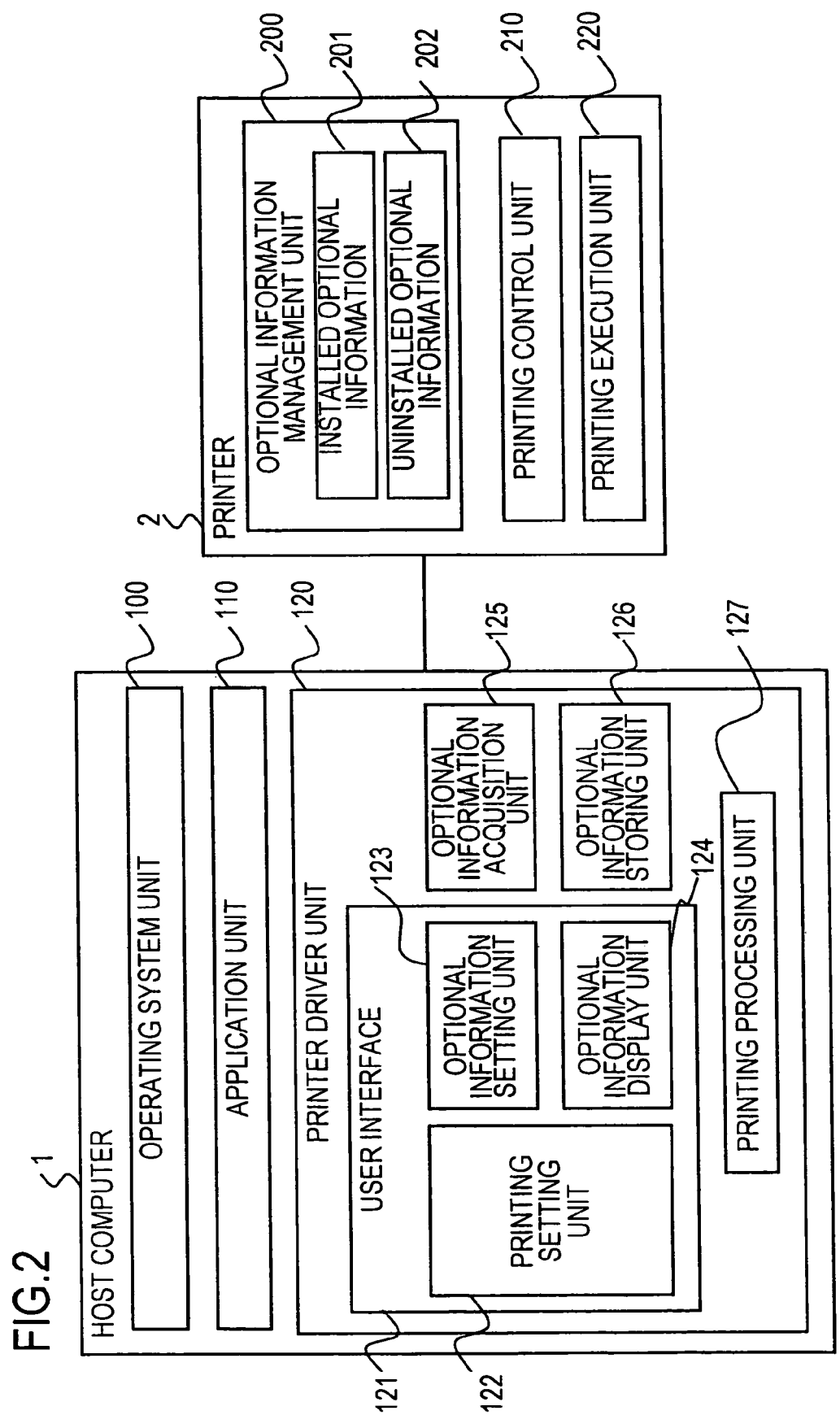
FIG. 2 is a functional structural diagram of the host computer 1 and printer 2.

FIG. 2 is a functional structural diagram of the host computer 1 and printer 2. As shown in FIG. 2, functionally, the host computer 1 is equipped with an operating system unit 100, an application unit 110, and a printer driver unit 120.

The application unit 110 is a portion that issues a request to print something created with the printer 2 and, for example, is composed of a document creating software.

The printer driver unit 120 is a driver for the printer 2 and is composed of a driver program stored in the HDD 13 or the like, the CPU 11 that executes the processing according to the program and the like. As shown in FIG. 2, the printer driver unit 120 comprises a user interface 121 having a printing setting unit 122 for the user to perform various settings such a printing conditions of the printer 2, and a printing processing unit 127 that receives a printing request from the application unit 110, generates printing data corresponding to the printing conditions, sends the printing data to the printer 2, and performs printing designation.

The printer driver unit 120 has a function of providing information relating to an optional device of the printer 2 and comprises an optional information setting unit 123 and optional information display unit 124 of the user interface 121, an optional information acquisition unit 125, and an optional information storing unit 126, as shown in FIG. 2, for realizing the aforementioned function.

The optional information setting unit 123 is a component that enables the information input by the user with respect to the installation status of the optional device of the printer 2. The optional information acquisition unit 125 is a component that acquires the information relating to the installation status of the optional device from the printer 2. Further, the optional information storing unit 126 is a component that stores the optional information acquired by the optional information setting unit 123 and optional information acquisition unit 125. The optional information display unit 124 is a components that displays to the user the optional information stored in the optional information storing unit 126. Specific features are inherent to the processing of providing the information relating to the optional device that is performed in these four components, and the specific contents of such processing will be described below. The program portion performing the functions of these four components are equivalent to information providing program employing the present invention. The program of printer driver unit 120 may be installed on the host computer 1 from a CD or other recording media on which it is stored, or may be downloaded to the host computer 1 from a prescribed site via the Internet or another network.

As shown in FIG. 2, functionally, the printer 2 includes an optional information management unit 200, a printing control unit 210, and a printing execution unit 220. The printing control unit 210 is the so-called controller that receives the printing data sent from the host computer 1, implements the predetermined data processing, and then transfers the data to the printing execution unit 220 and performs printing designation. The printing execution unit 220 is equivalent to the printer engine 26 and executes printing on the printing medium according to the printing designation.

The optional information management unit 200 is a component that manages information relating to the optional device installable on the printer 2. This component detects the installation status of the optional device at a predetermined timing and saves the installed optional information 201, which is the information relating to the installed optional device, and uninstalled optional information 202, which is the information relating to the uninstalled optional device. These kinds of information are transmitted in response to a request from the optional information acquisition unit 125 of the host computer 1. Further, the installed optional information 201 and uninstalled optional information 202 are also saved in the RAM 23 or the like, and the optional information management unit 200 is actuated by the operation of the CPU 22 according to the program stored in the ROM 24, as part of the controller. Further, it is also possible not to save the uninstalled optional information 202.

Providing information relating to the optional device to the user in the host computer 1 is a specific feature of the host computer 1 and printer 2 of the present embodiment that has the above-described configuration, and the specific contents of this operation will be described below.

The printer driver unit 120 prepares setting windows for the user to perform various settings of the printer 2, and a basic settings window for performing settings with respect to basic items relating to printing and a plurality of detailed settings windows for performing settings relating to detailed items or special items of printing or performing settings relating to the printing environment (presence of an optional device, and the like) are prepared as the setting windows. Because the specific feature is in providing information relating to the optional device, this operation being performed with the basic settings window, the display processing of the basic settings window will be explained below. In the basic settings window, the present setting contents can be browsed and the settings can be changed with respect to items, for example, such as the printing quality, paper size, and paper type. Further, in the Advanced Layout Tab Window shown in FIG. 5 that is the detailed settings window, the items such as page layout and page decoration at printing can be changed. In the Optional Settings Tab Window shown in FIG. 5 that is the detailed settings window, settings relating to the optional devices can be done and the settings can be made of verified.

Figure 3:
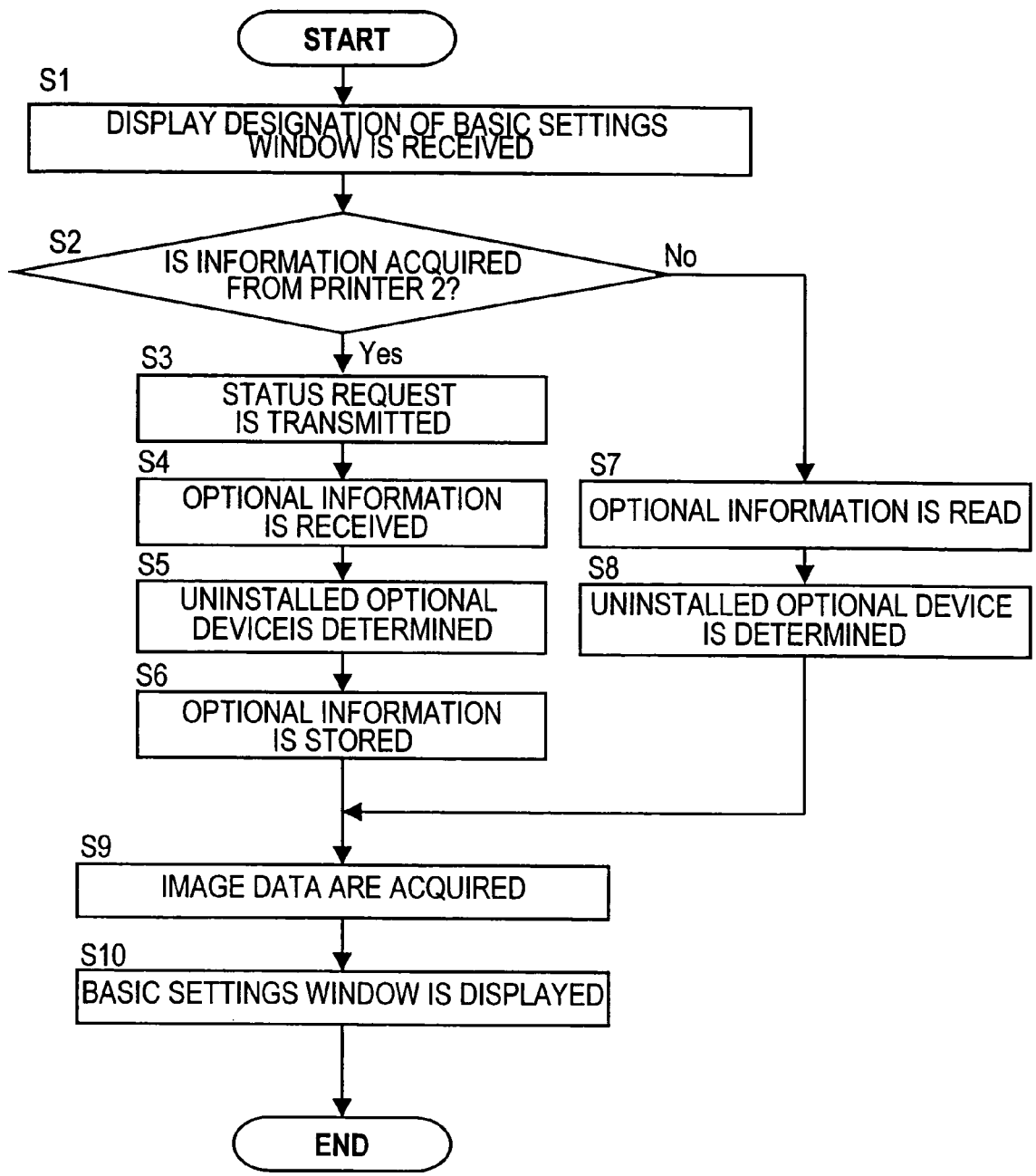
FIG. 3 is a flowchart illustrating a sequence of display processing on the basic settings window.

FIG. 3 is a flowchart illustrating an example of display processing sequence for the basic settings window. First, the user performs the display designation of the basic settings window. More specifically, the display designation of the basic settings window can be performed by an operation of selecting a property menu of the printer 2 from the window for the printing request provided by the application unit 110, or by selecting a printing setting menu from the user interface window provided by the printer driver unit 120.

The display designation of the basic settings window is received by the user interface unit 121 of the printer driver unit 120 (step S1) and then, it is determined whether the information acquisition from the printer 2 is performed (step S2). Here, the printer driver unit 120 may determine whether the information acquisition is performed by referring to the contents that has been set by the user in advance, or may determine that the information acquisition is performed when the bidirectional communication can be conducted between the host computer 1 and printer 2 and that the information acquisition is not performed when the bidirectional communication is impossible.

When the information acquisition from the printer 2 is determined to be performed (Yes in step S2), the printer driver unit 120 sends a status request to the printer 2 (step S3). The status request is a request relating to the present status of the printer 2. In response to this request, the printer 2 returns status information of various kinds to the host computer 1. The status information includes the above-described installed optional information 201 and uninstalled optional information 202 saved in the optional information management unit 200 of the printer 2.

The optional information acquisition unit 125 receives the installed optional information 201 and uninstalled optional information 202 of the status information that has been sent (step S4). Based on these types of information, the optional information acquisition unit 125 determines an installable optional device that is presently not installed on the printer 2 (that is, the uninstalled optional device) (step S5).

Here, when the uninstalled optional information 202 is received, the uninstalled optional device is confirmed by this information. Therefore, the uninstalled optional device is determined by the transmission of this information. On the other hand, when the uninstalled optional information 202 is not stored in the printer 2 and only the installed optional information 201 is received, the uninstalled optional device is determined by comparing a list of all optional devices installable on the printer 2 that has been saved in advance in the printer driver unit 120 and a list of presently installed optional devices that are indicated by the installed optional information 201.

Then, the optional information storing unit 126 stores the optional information obtained by the reception of information and determination of the uninstalled optional device in a registry of the operating system unit 100 (step S6). More specifically, whether or not the installation on the printer 2 has been performed is recorded for each of all the optional device that can be installed on the printer 2. FIG. 4 shows an example of the stored information.

The names of the optional devices installable on the printer 2 are shown in the left column of the table shown in FIG. 4, and whether or not each optional device has been installed on the printer 2 is shown in the right column. In the example shown herein, a 192 MB memory and a paper cassette 2 have been installed on the printer 2, whereas a 256 MB memory, a paper cassette 3, a two-stage paper cassette, and an HDD unit have not been installed on the printer 2, that is, they are the uninstalled devices. The paper cassette 2 and paper cassette 3 mean one-stage paper cassettes.

The storage processing of the optional information is performed by updating the information stored in the registry to match the present installation status.

On the other hand, when the information is determined in step S2 not to be acquired from the printer 2 (No in step S2), the optional information acquisition unit 125 reads the optional information that is presently stored in the registry of the operating system unit 100 (step S7) and determines the uninstalled optional device according to the information that was read out (step S8). Thus, an optional device that is considered not to be installed on the printer 2 based on the stored optional information is determined as the uninstalled optional device.

When bidirectional communication between the host computer 1 and printer 2 is impossible, the stored optional information can be appropriately updated by the user. More specifically, when the installation status of the optional device is changed, for example, by installing the optional device anew on the printer 2, the user can make the update by performing an operation of setting this installation status in the predetermined location prepared in the above-described detailed settings window (Optional Settings Tab Window shown in FIG. 5). In this case, the optional information setting unit 123 makes the update so that the optional information stored in the register matches the newest installation status based on the information inputted by the aforementioned user's operations.

Where the uninstalled optional device is thus determined for each case (S5, S8), the optional information display unit 124 acquires the data on the image displayed for each optional device (step S9). More specifically, the data on the icon of the determined uninstalled optional device and the data representing the external appearance image of the installed optional device in a state in which it has been installed on the printer 2 are acquired.

The specific contents of the icons of the uninstalled optional devices will be described below. The data on the icons are stored in the host computer 1 in a readable format with respect to all the optional devices that can be installed on the printer 2. Further, the data on the external appearance images in the installed state are stored in advance in the host computer 1 according to the installation status of the optional devices.

The display data relating to the optional information in the basic settings window is prepared by such data acquisition (S9). With respect to other information displayed on the basic settings window, the display data are also prepared from the received status information and information that has been set in advance in the host computer 1. Once the display preparation of the basic settings window is completed, the user interface unit 121 displays the basic settings window on the display device 14 based on the prepared data (step S10). The image of the optional device is displayed within the basic settings window by the optional information display unit 124.

Figure 5:
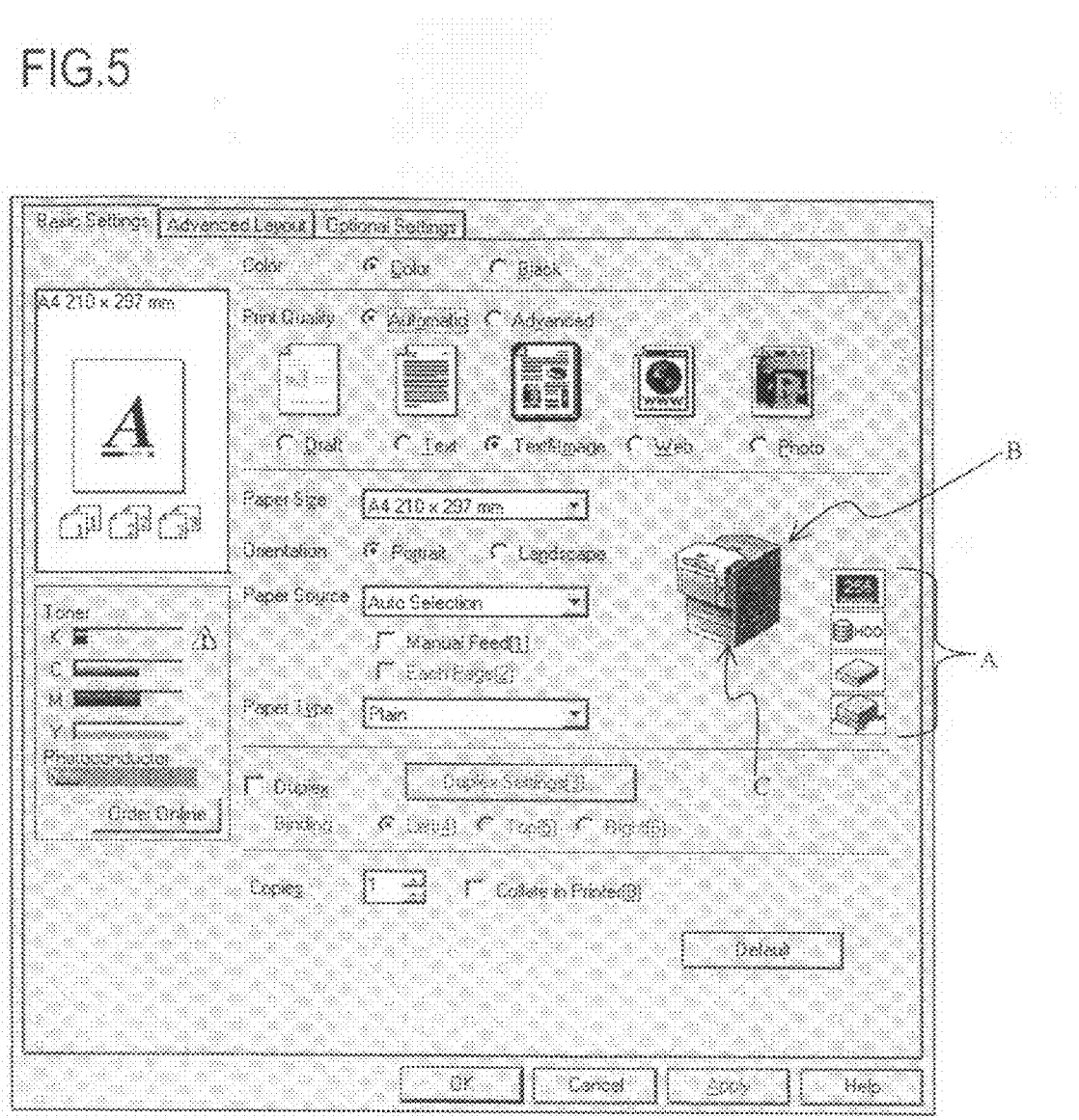
FIG. 5 illustrates an example of the basic settings window.

FIG. 5 shows an example of the displayed basic settings window. The portion represented by A in the figure shows the icons of uninstalled optional devices. Here, icons of the 256 MB memory, HOD unit, one-stage paper cassette 3, and two-stage paper cassette are displayed in the order of description from above according to the example shown in FIG. 4. Any images of the optional devices represented by icons may be employed, provided that the optional devices can be easily recognized by the user. Thus, abstract drawings of the devices, detailed illustrations, actual photographic images, rows of symbols representing the names, or combinations thereof can be employed.

Symbol B in FIG. 5 shows an external appearance image of the printer 2 including the installed optional device. In this external appearance image, symbol C in FIG. 5 shows the installed optional device; here, the device is a paper cassette 2 of the example shown in FIG. 4. The icon of the uninstalled optional devices and external appearance image are displayed based on the data on images acquired by the optional information display unit 124. Further, the icon (A) of the uninstalled optional device is displayed on the periphery of (close to) the external appearance image (B).

The display processing of the basic settings window is thus performed in the host computer 1.

In the present embodiment, the image of the uninstalled optional device and the external appearance image of the printer 2 are displayed on the basic settings window, but the external appearance image may be also displayed on the detailed settings window or on both the basic settings window and the detailed settings window.

The external appearance image of the printer 2 is displayed on the basic settings window, but it is also possible not to display the external appearance image.

Further, in the above-described embodiment, the display of the basic settings window is performed at the host computer 1, but it may be also performed at the printer 2. In such case, the controller of the printer 2 performs processing identical to that of the printer driver unit 120 and displays a similar basic settings window on the display of the control panel 30 of the printer 2. Further, in this case, the image data of the icon of the uninstalled optional device and external appearance image are preferably stored in the printer 2.

Further, in the above-described embodiment, the printer 2 is a laser printer, but it may be a printer of another printing system.

As described hereinabove, in the information providing device of the present embodiment, the information on the installable optional device that is presently uninstalled is displayed as an image on the user interface window with respect to the optional devices of the target apparatus. Therefore, the user can easily understand about uninstalled optional device, the effective usage of the target apparatus using optional devices is facilitated and, therefore, the probability of purchasing optional equipment can be increased. In addition, because the uninstalled optional device is displayed as an image, it can be easily understood by anybody, regardless of the language used, and it is not necessary to change the interface for the respective portion for each country of use.

Further, in the present embodiment, the external appearance image of the target apparatus including the installed optional device is also displayed, and the image of the uninstalled optional device is displayed on the periphery of (close to) the external appearance image. Therefore, the user can easier understand the installation of the uninstalled device.

Because the image of the uninstalled optional device is displayed on the basic settings window, detailed settings window, or both windows, the information relating to the uninstalled optional device can be provided in a form such that can be easier understood by the user.

Further, in the present embodiment, because the target apparatus where the optional device is installed is a printer and a large number of optional devices can be installed, it conforms to the application object of the present invention, but the target apparatus is not limited to the printer and can be another apparatus having optional devices, for example a copier.

Another Embodiment

In the above-described embodiment, as shown in FIG. 5, an icon of the uninstalled optional device is displayed on the basic settings window. As a modification, a configuration may be used in which an icon of the presently installed optional device is also displayed on the basis setting window and the display representation is such that the optional device that has not been installed and the installed optional device can be distinguished from one another. In such case, the optional devices that are displayed as icons on the basic settings window may be only those that cannot be displayed as the above-described external appearance images and those that are difficult to identify by the external appearance image.

Figure 6:
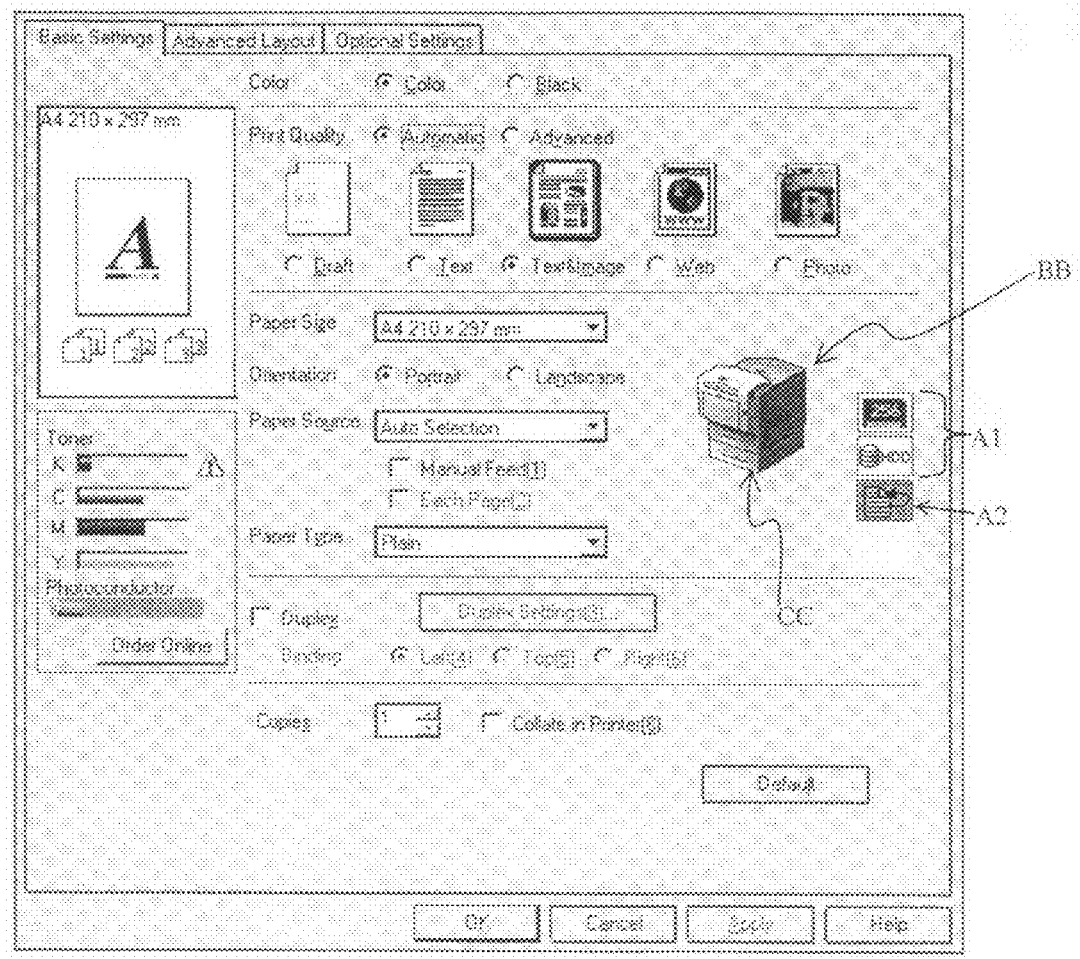
FIG. 6 illustrates an example of the basic settings window in the modification example.

FIG. 6 shows an example of a basic settings window in such modification example. In the example shown in FIG. 6, the icons indicated by A1 represent a 256 MB memory and an HDD unit that are optional devices that are presently installed, and the icon indicted by A2 represents a duplex printing unit (duplex printing mechanism) that is presently an uninstalled device. Further, in the present examples, as mentioned hereinabove, the optional devices that are displayed as icons are limited to those that cannot be displayed as external appearance images (BB in the figure) and those that are difficult to identify by the external appearance image.

Further, as shown in FIG. 6, the icon of the duplex printing unit that is uninstalled is shade displayed (gray-out displayed) and such display representation is easy to distinguish from the icon (A1) of the installed optional device that is not displayed in such way. Further, in the external appearance image BB in FIG. 6, the installed optional device is displayed in the same manner as in FIG. 5, here the paper cassette (CC) is shown. As described above, because the paper cassette is represented so that it can be easily identified in the external appearance image BB, an icon corresponding thereto is not displayed.

The processing in this modification example is performed by using the device configuration and processing sequence identical to those of the above-described embodiment. In the processing of data acquisition of image (S9) and display of the basic settings window (S10), the images are acquired and displayed on the basic settings window not only for the uninstalled optional device, but also for the optional device for which the aforementioned icon is displayed. Data for the aforementioned shade display and data for the usual display that have been prepared in advance and stored in a readable format in the host computer 1 are preferred as the image data for the icons of the optional devices.

The above-described shade display is used to distinguish between the installed and uninstalled devices, but the display suitable for such purpose may be also performed by a method of changing the color or size of the icons or providing the icons with peaks and valleys.

Further, in the above-described examples, the optional devices displayed as icons on the basic settings window are assumed to be impossible to display by the external appearance image or difficult to identify by the external appearance image, but icon display may be also applied to all the optional devices that can be installed. Further, in this case, the display of external appearance images may be omitted.

The above-described external appearance images and icons, or only icons may be displayed on the aforementioned detailed setting display, or on both the basic setting display and the detailed setting display.

Further, in this modification example, the display of the basic settings window may be also performed on the printer 2, in the same manner as in the above-described embodiment.

As described hereinabove, in the modification example, images of not only the uninstalled optional devices, but also of the optional devices that are presently installed are displayed on the user interface window, and these images are displayed so that the installed and uninstalled devices can be distinguished from one another. Therefore, the convenience for user is further increased.

The protection scope of the present invention is not limited to the above-described embodiments and includes the inventions described in the claims and equivalents thereof.

What is claimed is:

1. A computer readable medium recording an information providing program for causing an information providing device to execute a processing of providing information relating to an optional device installable on a target apparatus; said program causing said information providing device to execute:
    acquiring information relating to the installation status of the optional device on said target apparatus and determining an uninstalled optional device, which is an installable optional device that has not been installed; and
    displaying an image representing said determined uninstalled optional device to a user, wherein
    an interface window that comprises a basic settings window and a detail settings window and that serves for a user to perform a setting operation for the target apparatus is provided by the information providing device; and
    the display of the image representing the uninstalled optional device is performed on the basic settings window.

2. The computer readable medium according to claim 1, wherein an image representing the optional device that has been installed on said target apparatus is displayed to the user so that the installed optional device can be distinguished from said uninstalled optional device.

3. The computer readable medium according to claim 2, wherein said image representing the uninstalled optional device is displayed as an icon that is gray-out displayed.

4. The computer readable medium according to claim 2 or 3, wherein
    an external appearance image of said target apparatus including said optional device that has been installed on said target apparatus is also displayed to the user; and
    said display of said image is performed with respect to the optional device that is not displayed in said external appearance image.

5. The computer readable medium according to claim 1, wherein the external appearance image of said target apparatus including the optional device that has been installed on said target apparatus is also displayed to the user.

6. The computer readable medium according to claim 5, wherein said image representing the uninstalled optional device is displayed close to said external appearance image of said target apparatus.

7. The computer readable medium according to any of claim 1, 5, or 6, wherein data on said image are stored in said information providing device for all the installable optional devices of said target apparatus.

8. The computer readable medium according to claim 1, wherein said target apparatus is a printer, and said information providing device is a host device of said printer or said printer.

9. An information providing device that provides information relating to an optional device installable on a target apparatus, said information providing device comprising:
    an information acquisition unit which acquires information relating to an installation status of the optional device on said target apparatus and determines an uninstalled optional device, which is an installable optional device that has not been installed; and an information display unit which displays an image representing said determined uninstalled optional device to a user, wherein the information providing device provides an interface window that comprises a basic settings window and a detail settings window and that serves for a user to perform a setting operation for the target apparatus, and the display of the image representing the uninstalled optional device is performed on the basic settings window.

10. A method for providing information in an information providing device that provides information relating to an optional device installable on a target apparatus, said method comprising:

a step in which said information providing device acquires information relating to an installation status of the optional device on said target apparatus and determines an uninstalled optional device, which is an installable optional device that has not been installed;

a step in which said information providing device displays an image representing said determined uninstalled optional device to a user; and a step in which said information providing device provides an interface window that comprises a basic settings window and a detail settings window and that serves for a user to perform a setting operation for the target apparatus, wherein the display of the image representing the uninstalled optional device is performed on the basic settings window.

* * * * *